US008635218B2

(12) United States Patent
Kwok et al.

(10) Patent No.: US 8,635,218 B2
(45) Date of Patent: Jan. 21, 2014

(54) GENERATION OF XSLT STYLE SHEETS FOR DIFFERENT PORTABLE DEVICES

(75) Inventors: Thomas Y. Kwok, Washington Township, NJ (US); Linh H. Lam, Yorktown Heights, NY (US); Thao N. Nguyen, Katonah, NY (US); Kakan Roy, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 2217 days.

(21) Appl. No.: 10/653,665

(22) Filed: Sep. 2, 2003

(65) Prior Publication Data

US 2005/0050000 A1    Mar. 3, 2005

(51) Int. Cl.
*G06F 7/00*          (2006.01)

(52) U.S. Cl.
USPC .......................................................... 707/736

(58) Field of Classification Search
USPC ................ 707/100, 10, 1, 3, 5, 736, 999.101, 707/999.102, 7
See application file for complete search history.

(56) References Cited

U.S. PATENT DOCUMENTS

| | | | | |
|---|---|---|---|---|
| 5,486,686 A | * | 1/1996 | Zdybel et al. | 235/375 |
| 5,848,415 A | * | 12/1998 | Guck | 707/10 |
| 6,704,024 B2 | * | 3/2004 | Robotham et al. | 345/581 |
| 6,748,569 B1 | * | 6/2004 | Brooke et al. | 715/207 |
| 6,826,597 B1 | * | 11/2004 | Lonnroth et al. | 709/207 |
| 7,069,504 B2 | * | 6/2006 | Mani et al. | 715/239 |
| 7,149,776 B1 | * | 12/2006 | Roy et al. | 709/205 |
| 2002/0015042 A1 | * | 2/2002 | Robotham et al. | 345/581 |
| 2002/0099739 A1 | * | 7/2002 | Fischer | 707/515 |
| 2002/0111960 A1 | * | 8/2002 | Irons et al. | 707/204 |
| 2004/0024739 A1 | * | 2/2004 | Copperman et al. | 707/1 |
| 2004/0060004 A1 | * | 3/2004 | Mani et al. | 715/513 |
| 2005/0028156 A1 | * | 2/2005 | Hammond et al. | 718/100 |

* cited by examiner

*Primary Examiner* — Hosain Alam
*Assistant Examiner* — Eliyah S Harper
(74) *Attorney, Agent, or Firm* — Ido Tuchman; Preston J. Young

(57) ABSTRACT

A method, system, and computer program for transforming a first document into a second document, whereby the second document is configured for use at an electronic device. The invention receives interface information about the electronic device. A content rules selector is configured to select content rules for modifying content in the first document. A presentation rules selector is configured to select presentation rules for presenting the content from the first document. A transformation generator is configured to combine the content rules and presentation rules to form transformation instructions for transforming the first document into the second document.

13 Claims, 5 Drawing Sheets

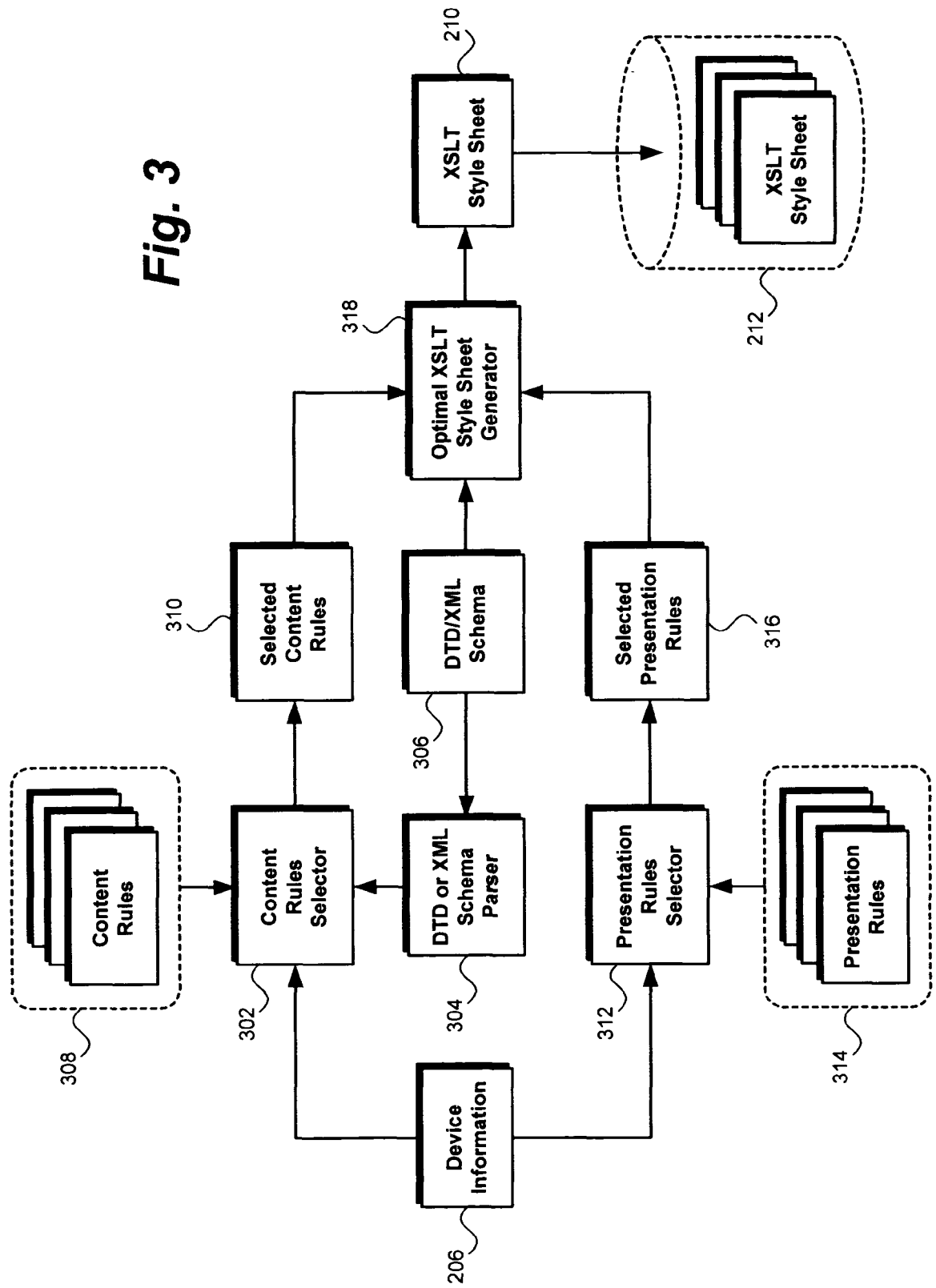

```
402
<CustomerNo>1234567</CustomerNo>
<OrderNo>123456</OrderNo>
<Name>John Smith</Name>
<Address>123 Main Street, Anycity, ST 10000</Address>
```

*Fig. 4A*

```
1. If (deviceType="WML1")&(DTD="test") then <Address>=null
2. If (deviceType="WML1")&(DTD="test") then (link1="Home")&(link2="Retry")
```

*Fig. 4B*

```
1. If (deviceType="WML1") then <do>=<select>
2. If (deviceType="WML1") then ("$"="&&")
```

*Fig. 4C*

```
<xsl:template match="Root">
     <card id="card1" title="Test">
Customer Number:<b><xsl:value-of
     select="CustomerNo"/></b><br/>
Order Number:<b><xsl:value-of select="OrderNo"/></b><br/>
Customer Name:<b><xsl:value-of select="Name"/></b><br/>
<select>
<option title="Retry" onpick="{$retryURL}">Retry</option>
<option title="IBM" onpick="{$homeURL}">Home</option>
</select>
</card>
</xsl:template>
```

*Fig. 4D*

GENERATION OF XSLT STYLE SHEETS FOR DIFFERENT PORTABLE DEVICES

FIELD OF THE INVENTION

The present invention relates generally to translating documents for use on different devices, and more specifically, to translating documents for use on different devices using separate content rules and presentation rules.

BACKGROUND

The wireless Web represents the convergence of two important technologies: the Internet and wireless communications. The Internet has already changed how people interact, work, entertain, and do business. Wireless technology, such as cellular phones, personal digital assistants (PDAs) or other kinds of wireless pervasive devices, has altered notions of time and place, enabling people to communicate with each other from almost anywhere around the world. Wireless technology has added a mobile dimension to electronic commerce. Nowadays, there are many promising and popular applications that deliver content and services to users on the wireless Web.

In general, wireless pervasive devices have limitations that differentiate them from other general purpose computers. The small screens available on most cellular phones, Personal Digital Assistants (PDAs), and other wireless pervasive devices provide relatively small display sizes (sometimes only a few lines of text). The stateless connection and limited bandwidth of most wireless networks also greatly constrain the amount of information that can be delivered to wireless pervasive devices. Rather than a full keyboard, many wireless devices contain only a few input buttons for entering information.

Wireless Application Protocol (WAP) is one of the most popular, dominant and important technology for wireless Web applications. It is a collection of standards and protocols that provides a development layer for wireless Web applications. WAP is an open technology for delivering Web content to user-agents, browsers or micro-browsers that are built or downloaded from networks into wireless pervasive devices.

The Standard Generalized Markup Language (SGML) is a language that supplies the tools for defining markup languages. HyperText Markup Language (HTML) is such a markup language. HTML is called an SGML application and consists of a well-defined set of elements, attributes, and entities. Since HTML delivers too much information for the limited screen displays of most wireless pervasive devices, Handheld Device Markup Language (HDML) has been developed for use on wireless handheld devices. HDML is much simpler than HTML and is well suited for presentation in many wireless pervasive devices. Furthermore, WAP designs and defines a new format, the Wireless Markup Language (WML), for efficient content delivery to wireless pervasive devices. WML uses a new model of the card and deck metaphor for content delivery. Because WAP delivers a deck of related cards at once, each card representing a screen of information, there is no waiting for the next screen to display. This differs from the wired Web, where clicking on a new link typically requires waiting for the server to deliver a new page. Moreover, wireless Web users usually will not tolerate seemingly endless scrolling or key presses just to retrieve data. Thus, the use of the card and deck metaphor in the user interface design is very important to provide users with a wireless browsing experience that parallels that available over the wired Web.

One of the biggest problems with publishing content on the Web is making sure that it remains current and accurate. It is a very time consuming and tedious process to update an HTML or WML document by editing its data because the content is mixed with both the data and the information telling the user-agents, browsers, or micro-browsers how to present the data. As a result, new markup languages and technologies have been recently developed to allow separation of content data and content presentation information. EXtensible Markup Language (XML) has been developed to just handle the content data of documents. It is a very simple dialect of SGML to fill the gap between SGML's power and complexity and HTML's inadequacy and simplicity. XML documents can be validated to make sure their structure and content data conform to defined rules. These rules are specified in a document called a Document Type Declaration (DTD). In other words, a DTD consists of elements and attribute declarations that define the allowable element structure of an XML document of a specified type. XML schemas can also be used to define document structures. XML schemas can specify the actual data types of each element's content, inherit syntax from other schemas, annotate schemas, use schemas with multiple namespaces, create simple and complex data types, and much more.

A style sheet is a declaration of presentation rules. It is used to specify the exact format of the presentation of a document. A style sheet supplies information to conforming user-agents or browsers as to how to portray an HTML or XML document. Style sheets such as Cascading Style Sheets (CSS) control how HTML content is formatted. XML has its own style language called eXtensible Style Language (XSL). XSL is based on a profile of Document Style and Semantics Specification Language (DSSSL). It is essentially a data driven style mechanism that allows formatting information to be associated with elements in the source document to produce formatted output. Moreover, it provides a standard way of extracting information in an XML document that should be included in the presentation, and expressing how this information should be presented. XSL generally consists of two parts: a transformation language and a formatting language. The transformation language is used to transform documents into different forms, while the formatting language is used to format and style documents in various ways. The transformation language is called extensible Style Language Transformations (XSLT) and the formatting language is called XSL Formatting Objects (XSL-FO). XSL-FO is a set of XML elements that broadly define, for example, regions of a Web page and the appearance of content within those regions. It provides the syntax used to describe the appearance of the document. XSL-FO also provides the means of applying that syntax to existing XML data. Moreover, XSL-FO is the means of writing style sheets specifying how an XML document should change and use new formatting objects in place of its original elements. Put simply, XML enables users to structure data in documents, and XSLT enables users to work with the contents of XML documents such as selecting and manipulating the content and creating other documents. Thus, XSLT provides a complete transformation language that enables users to work with the contents of XML documents without writing program code, transforming those documents into another XML documents, such as HTML, HDML, WML, or other text-based formats. An XSLT style sheet can be read by a Java servlet in a server, a browser, and standalone XSLT engines or processors that work on XML documents. An example of an XSLT engine is the IBM Websphere Transcoding Publisher (WTP). Thus, XSLT is an important tool for controlling how text is displayed and moved around on a Web page, controlling the quality of the user interfaces or the look and feel of Web pages.

Wireless pervasive devices including cellular phones, PDAs and handheld or portable computers come with different form factors. They vary greatly in display size, keypads, supported functions and software keys. Moreover, there are different features, functionalities and capabilities in different mobile devices. Some of these devices have enough computing power and memory such that only limited wireless access to networks is required. Other devices, however, may need network connections and associated bandwidth to delivery full functionality. As a result, the wireless pervasive device itself becomes an integral component of the wireless Web experience. Therefore, it is the quality of user interface or the look and feel of Web pages that generally will determine the success of any wireless Web applications.

As the wired Web becomes more widely used for publishing, electronic commerce, distant learning and the delivery of government services, it is vital that the wired Web be accessible to as many people as possible. Thus, more than one XSLT style sheet is usually read when an XML document is formatted for different devices of different form factors. This XML document can be formatted for printing on paper, displaying on a screen, and formatted for people of physical or sensory disabilities. For example, people with low residual vision often need a larger font size while people with color-blindness often require text in just black and white color. People who are visually impaired may request for an audio version for speech browsers or screen readers. Persons who are hearing impaired may need a version with images replacing different sounds. People who are physically challenged may want keyboard-only navigation or specific navigation tools.

The use of XSLT style sheets in the wireless applications is tedious and cumbersome. The differences among different wireless browsers or user-agents are large enough to have the GUI modified for each browser or user-agent since screen sizes and functions vary a lot. For the output to the wireless pervasive devices, it can be one of the following standards: WML, HDML, i-mode C-HTML, Palm OS HTML, voice XML or others. Moreover, cell phones, PDAs, handheld and portable computers, and other wireless pervasive devices have different screen sizes and functional keys. Just for the case of WML enabled wireless pervasive devices, it is very difficult and almost impossible to construct a single XSLT style sheet to produce a single WML which can be used for different WML enable micro-browsers or user-agents. Generally, different XSLT style sheets have to be manually constructed for different WML enabled PDAs or cell phones. In the setup of a new wireless application, different WMLs have to be generated from these different XSLT style sheets by an XSLT engine or tool. This setup process is very tedious and cumbersome. For dynamic generation, the servlets, JSPs or ASPs can identify the device client by detecting two HTTP header values: User-Agent and Accept. Then, the corresponding XSLT style sheets are chosen for the XSLT engine to produce the corresponding WML documents for the WML enable PDAs or cell phones with a particular browser or user-agent. As a result, the application developer typically has to manually construct quite a number of XSLT style sheets just for one wireless application.

SUMMARY OF THE INVENTION

The present invention addresses the above-mentioned limitations by providing a mechanism for automatically generating transformation instructions (such as XSLT style sheets) for various devices and applications. The transformation instructions are generated or created by combining content rules and presentation rules based on device interface information. Such transformation instructions can be cumbersome and tedious to create using conventional techniques. Therefore, the present invention helps reduce developer overhead of learning different data formats. Furthermore, the present invention can significantly shorten the development cycle of wireless applications and thereby support a wide range of wireless devices.

Thus, one aspect of the invention is a method for transforming a first document into a second document, where the second document is configured for use at an electronic device. The method includes a receiving operation to receive interface information about the electronic device. A first selecting operation is configured to select content rules for modifying content in the first document according to the interface information. A second selecting operation selects presentation rules for presenting the content from the first document according to the interface information. A combining operation is configured to combine the content rules and presentation rules to form transformation instructions for transforming the first document into the second document.

Another aspect of the invention is a system for transforming a first set of markup documents into a second set of markup documents, with the second set of markup documents configured for use at an electronic device. The system includes a content rules selector configured to select a set of content rules. The content rules are devised to modify content in the first set of markup documents according to the interface information. A presentation rules selector is configured to select a set of presentation rules. The presentation rules are employed to modify presentation directives in the first set of markup documents according to the interface information. A transformation generator is configured to combine the set of content rules and the set of presentation rules to form transformation instructions for transforming the first set of markup documents into the second set of markup documents.

Yet another aspect of the invention is a computer program for transforming a first document into a second document, whereby the second document is configured for use at an electronic device. The computer program includes code to receive interface information about the electronic device, select content rules for modifying content in the first document, select presentation rules for presenting the content from the first document, and combine the content rules and presentation rules to form transformation instructions for transforming the first document into the second document.

The foregoing and other features, utilities and advantages of the invention will be apparent from the following more particular description of various embodiments of the invention as illustrated in the accompanying drawings.

BRIEF DESCRIPTION OF THE DRAWINGS

FIG. 3 shows one system contemplated by the present invention for generating transformation instructions.

FIG. 4A shows a sample XML excerpt for use by the present invention.

FIG. 4B shows sample content rules for use by the present invention.

FIG. 4C shows sample presentation rules for use by the present invention.

FIG. 4D shows a sample XSLT style sheet for use by the present invention.

DETAILED DESCRIPTION OF THE INVENTION

Figure 1:
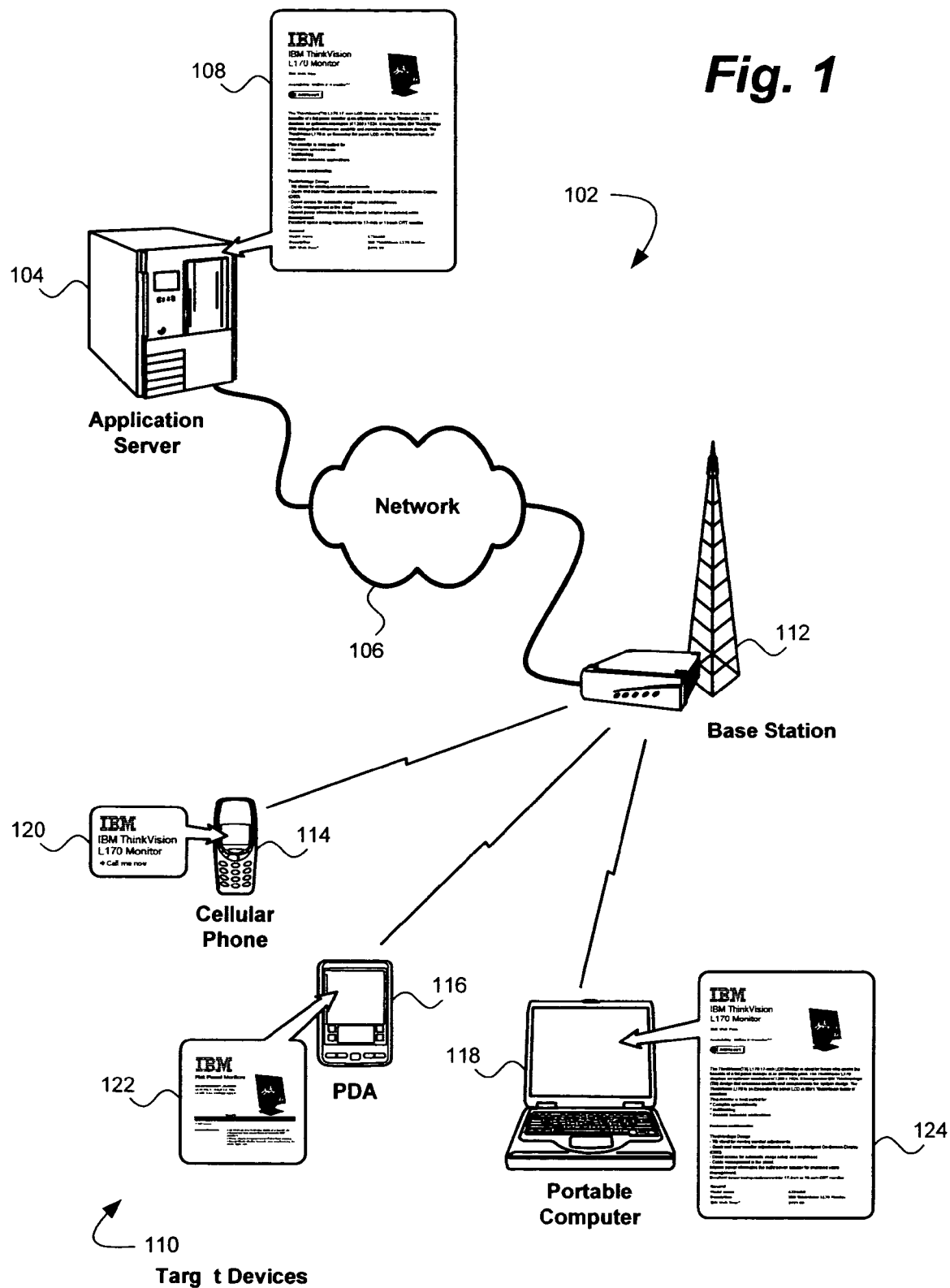
FIG. 1 shows an exemplary network environment embodying the present invention.

The following description details how the present invention is employed to deliver content to various electronic devices. Throughout the description of the invention reference is made to FIGS. 1-5. When referring to the figures, like structures and elements shown throughout are indicated with like reference numerals.

In FIG. 1, an exemplary environment 102 embodying the present invention is shown. It is initially noted that the environment 102 is presented for illustration purposes only, and is representative of countless configurations in which the invention may be implemented. Thus, the present invention should not be considered limited to the system configuration shown in the figure.

The environment 102 includes an application server 104 coupled to a computer network 106. The application server 104 is configured to deliver content 108 to target devices 110 communicating over the network 106. The content 108 may include text, images, audio clips, and other information. As explained in detail below, the present invention beneficially allows the application server 104 to efficiently tailor the content 108 and its presentation according to the user interface capabilities and characteristics of the target device 110 receiving the content 108. For example, if the target device 110 does not have audio capabilities, the application server 104 may modify the content 108 so that audio information is not transmitted to the target device 110. By doing so, content download time is reduced and potential incompatibility errors are avoided.

The network 106 may be any network known in the art for effectuating communications between the various devices within the environment 102. Thus, the network 106 can be a Local Area Network (LAN), a Wide Area Network (WAN), or a combination thereof. It is contemplated that the network 106 may be configured as a public network, such as the Internet, and/or a private network, and may include various topologies and protocols know to those skilled in the art. In a particular embodiment of the present invention, the network 106 may further include a base station 112. The base station 112 allows wireless devices to communicate with the network 106. For example, the base station 112 may receive and transmit information to and from wireless devices, such as cellular phones 114, PDAs 116, portable computers 118, handheld computers, etc.

To better illustrate the operation of the present invention, it is assumed, for example, that the application server 104 belongs to an online retailer. The server 104 enables network visitors to purchase the retailer's products electronically by transmitting content 108 to the target devices 110 over the network 106. The content 108 is stored in computer readable media and formatted according to a structured markup language, such as extensible Markup Language (XML). Using the present invention, the retailer is able to automatically adjust the content delivered to the target devices 110 according to user interfaces each device supports. For instance, a visitor using a cell phone 114 to view the content 108 may receive small content 120 formatted in WML protocol, a visitor using a PDA 116 may receive medium content 122 formatted in WML, and a laptop computer 118 may receive large content 124 formatted in HTML.

Thus, as described in detail below, the present invention beneficially allows content 108 from the application server 104 or other content delivery mechanisms to automatically tailor the information to the various devices 110 according to their interface characteristics and supported protocols. The present invention saves an administrator from the daunting task of manually creating and maintaining content pages for each target device 110 with its own unique interface and/or protocol characteristics.

Figure 2:
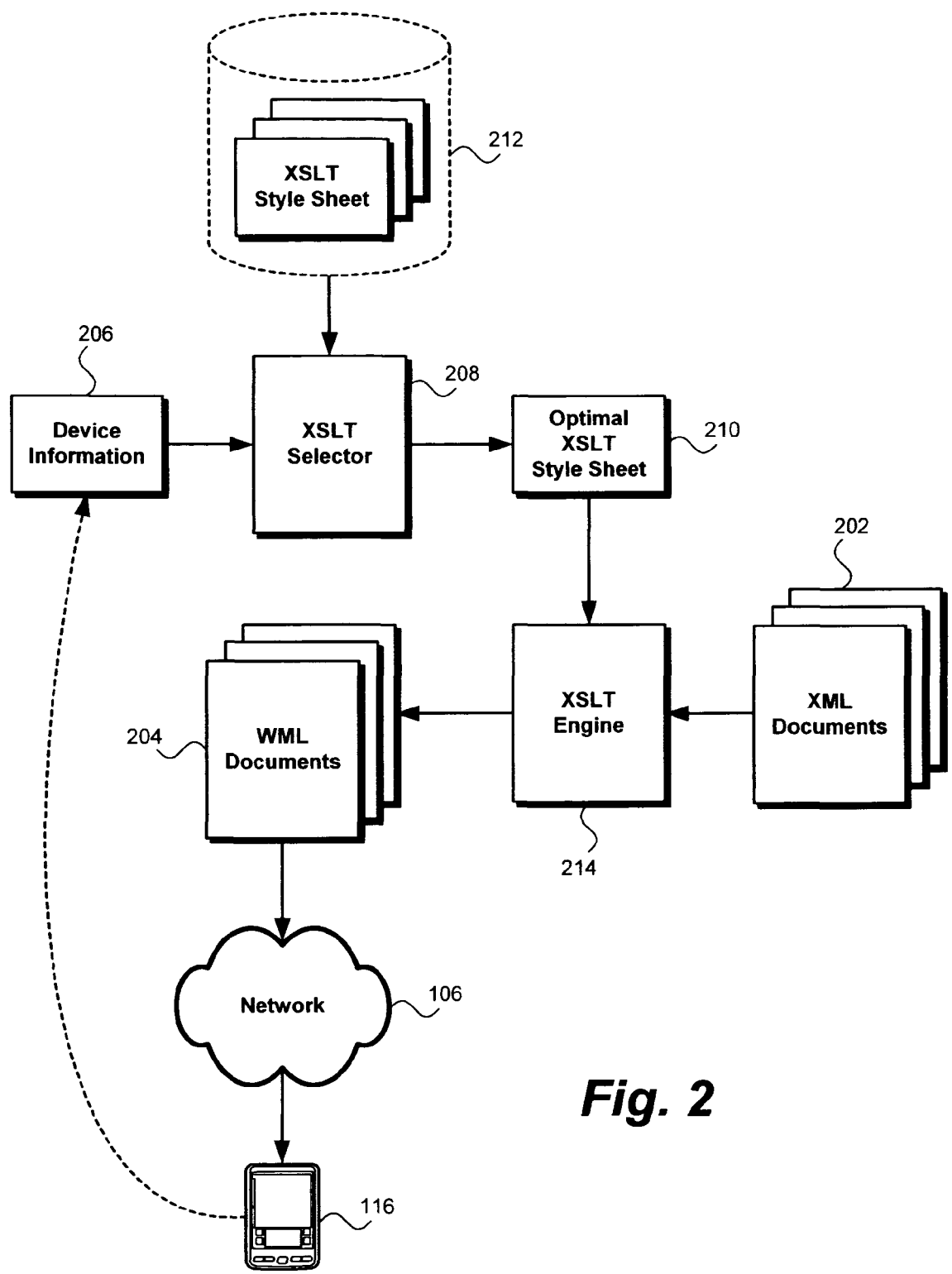
FIG. 2 shows a system for transforming a first set of markup documents into a second set of markup documents in accordance with one embodiment of the present invention.

In FIG. 2, a system for transforming a first set of markup documents 202 into a second set of markup documents 204 in accordance with one embodiment of the present invention is shown. The second set of markup documents 204 are optimally configured for presentation at a target device 116. Thus, the content and presentation of the second set of documents 204 are tailored according to the user interface characteristics of the target device 116. In a particular configuration of the system, the first set of markup documents 202 are formatted in XML, while the second set of markup document 204 may be formatted as HyperText Markup Language (HTML), wireless markup language (WML), handheld device markup language (HDML), compact HyperText Markup Language (cHTML), Palm OS HTML, VoiceXML, and other protocols known to those skilled in the art.

The system receives device information 206 about the target device 116. The device information 206 may include specifications about the type of device displaying the second set of markup documents 204. For example, the device information may contain the device model, screen size, keypad type, and preferred language of the target device 116. In one embodiment of the invention, the device information is received from the target device 116 via the network 106 or through direct connection. The device information 206, for example, may be embedded in a message header from the target device 116. Alternatively, the device information 206 may be entered manually by an administrator only once for each new device or device type.

The device information 206 is passed to an XSLT selector 208. The XSLT selector 208 uses the device information 206 to locate an optimal XSLT style sheet 210 from a pool of XSLT style sheets 212. In a particular embodiment of the invention, the selection of an optimal style sheet by the XSLT selector 208 is based on a set of content rules corresponding to both the device information and the document's DTD or XML schemas 306 (described below with reference to FIG. 3), and a set of presentation rules 314 corresponding to the device information 206. If there is no XSLT style sheet corresponding to the target device 116, a generic or default style sheet is selected. As described in detail below, the pool of XSLT style sheets 212 is created and assembled using separate content rules and presentation rules for the various devices communicating with the application server. Each style sheet in the pool 212 supplies information to conforming user-agents and browsers as to how to portray the first set of markup documents 202. As mentioned above, a style sheet includes a transformation language that provides a standard way of indicating what information in a markup document should be included in the presentation, and expressing how this information should be presented. In a particular embodiment of the invention, each style sheet in the pool 212 is formatted as an XSLT document under the XSL standard. It is contemplated, however, that other style sheet configurations known in the art may be employed by the present invention.

Once the optimal XSLT style sheet 210 is chosen by the XSLT selector 208, it is passed to an XSLT engine 214. The XSLT engine 214 uses the optimal XSLT style sheet 210 to transform the set of XML documents 202 into the set of WML documents 204. The WML documents 204 are then transmitted to the target device 116 through the network 106 for presentation to the user. Thus, the present invention eliminates the need for administrators to maintain and update different document sets for different target devices. The present invention beneficially allows one set of markup documents 202 to be automatically transformed into different sets markup documents 204 tailored for presentation in different devices with different user interfaces.

In FIG. 3, one system contemplated by the present invention for generating an XSLT style sheet 210 is shown. The system includes a content rules selector 302 that receives device information 206 about the target device communicating with the server. In a particular configuration of the invention, device information 206 may be manually entered by an administrator only once for each new device or device type. For example, a form may be presented to enter device information or characteristics, such as the screen size, the maximum number of lines allowed for display, the maximum characters per line, any supported software keys and functions, as well as the supported languages of the device browser or agent. The content rules selector 302 is also coupled with a DTD/XML schema parser 304. The parser 304 inputs a DTD/XML schema document 306 associated with the set of markup language documents to be transmitted to the portable device.

As mentioned above, a DTD/XML schema document 306 is used to validate XML documents. A DTD document consists of elements and attribute declarations that define the allowable element structure of an XML document of a specified type. Similarly, an XML schema specifies the actual data types of each element's content, inherit syntax from other schemas, annotate schemas, use schemas with multiple namespaces, and other configurations. The content rules selector 302 uses the document's DTD or XML schemas 306 with the help of the DTD/XML schema parser 304 to construct or select those content rules relevant to the document based on its allowable element structure and the actual data type of each element's content. In a particular embodiment of the invention, the XPaths from the DTD/XML schema parser 304 are used to extract or select the relevant content rules.

Using the device information 206 and the DTD/XML schema parser 304, the content rules selector 302 searches a content rules library 308 and selects optimal content rules 310 from the content rules library 308.

Turning now to FIG. 4A, a sample XML excerpt 402 is shown to illustrate system operation. The XML document includes several elements delineated with tags: <CustomerNo>, <OrderNo>, <Name>, and <Address>. In FIG. 4B, two content rules affecting the XML excerpt 402 are shown. Rule 1 specifies that the Address element be assigned a "null" value when a deviceType variable equals "WML1" and a DTD variable equals "test". Rule 2 specifies that variable link1 be assigned the value "Home" and variable link2 be assigned the value "Retry" when the same conditions occur. These rules change the content of the XML excerpt 402 by modifying the Address element and introducing new content to soft buttons "link1" and "link2".

Returning to FIG. 3, the device information 206 is also received by a presentation rules selector 312. The presentation rules selector 312 searches a presentation rules library 314 and selects the most appropriate presentation rules 316 based on the device information 206.

In FIG. 4C, two exemplary presentation rules are shown. The first rule renames <do> tags into <select> tags when a deviceType variable equals "WML1". The second presentation rule changes the "$" character into "&&" characters with the deviceType variable equals "WML1". These rules do not affect the content in elements, just how the content is communicated to and presented at the target device.

Returning again to FIG. 3, an optimal XSLT style sheet generator 318 receives the selected content rules 310, the selected presentation rules 316, and the DTD/XML schema document 306, and generates the XSLT style sheet 210. The XSLT style sheet 210 is configured to transform the XML documents at the application server into markup documents optimized for delivery at the target device. For example, in FIG. 4D, a sample XSLT style sheet is shown. This sample XSLT style sheet instructs a target device to display a screen asking the user to select the customer number, the order number and customer name of the user's previous purchase order in order to retrieve and display the user's order status on the next screen. This screen also allows the user to retry the selection of all these three numbers or go back to an IBM home page.

Returning to FIG. 3, in one embodiment of the invention, once the XSLT style sheet 210 is generated, it is then stored in a pool of XSLT style sheets 212 for later access. In another embodiment of the invention, the XSLT style sheet 210 is applied directly to an XSLT engine (see FIG. 2) to dynamically produce markup documents for the target device.

Figure 5:
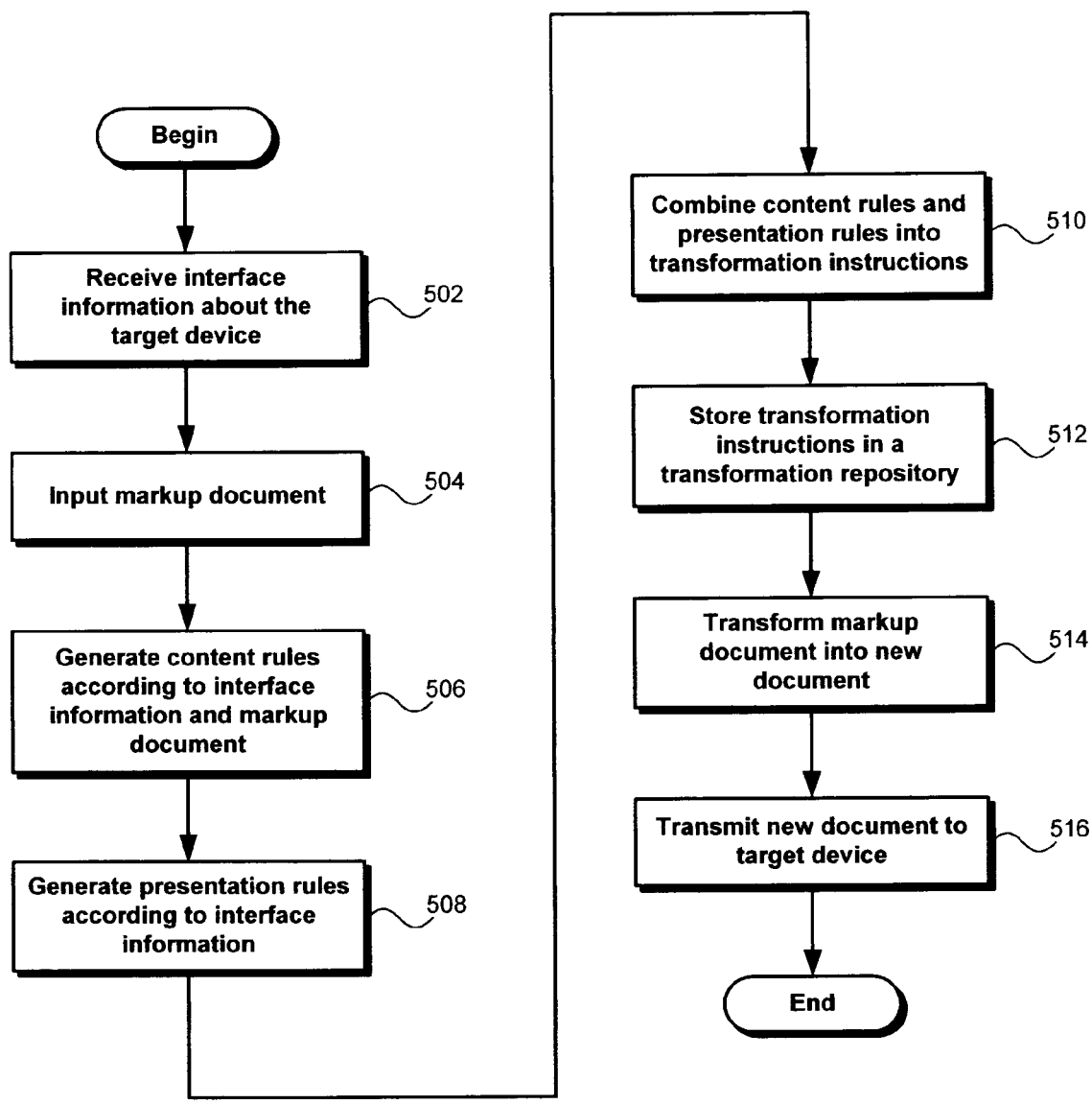
FIG. 5 shows a flowchart for transforming a first markup document into a second document in accordance with one embodiment of the invention.

In FIG. 5, a flowchart for transforming a first markup document into a second document in accordance with one embodiment of the invention is shown. It should be remarked that the logical operations shown may be implemented (1) as a sequence of computer executed steps running on a computing system and/or (2) as interconnected machine modules within the computing system. The implementation is a matter of choice depending on the performance requirements of the system implementing the invention. Accordingly, the logical operations making up the embodiments of the present invention described herein are referred to alternatively as operations, steps, or modules.

Operation flow begins at receiving operation 502. During this operation, interface information is received about the electronic device that will eventually take delivery of the second set of markup documents. The interface information may include such data as a model number of the device, screen size, input/output capabilities and preferred language. It is contemplated that default values may be substituted for data not found in the interface information. For example, if no language preference is indicated, the application server may use English as the default language. It is also contemplated that the interface information may be obtained by explicitly polling the electronic device. Alternatively, the electronic device may routinely transmit interface information upon initialization of communication sessions with the application server. Once the receiving operation 502 is completed, control passes to inputting operation 504.

At inputting operation 504, the first markup document that is requested by the user of the target device is input by the application server. As discussed above, the markup document may be embodied as an XML document and one or more DTD document. In place of or in addition to DTD documents, XML schema documents may be used to define content structure in the markup document. Once the inputting operation 504 is completed, control flow passes to generating operation 506.

At generating operation 506, content rules are generated according to the interface information and the markup document. In one embodiment of the invention, a DTD or XML schema parser may be used to extract the different XPaths from the DTD document or XML schema. A content rule generator then constructs a set of content rules based on all the tags under each XPath. The content rules may be stored in a content rules pool for later access. In a particular embodiment of the invention, these content rules can be used by other similar target devices or target devices of the same type, as well as other XML documents with the same DTD or XML schema requested by the user. Additionally, content rules may be manually entered by an administrator directly only once for each new device or device type and each DTD or XML schema. The generating operation 506 may also include a content rule optimizer to convert or optimize old content rules stored in the content rules pool into new content rules that are optimized for the electronic device. Alternatively, the administrator may manually select and assemble a set of content rules for the electronic device from the content rules pool. After generating operation 506 is completed, control passes to generating operation 508.

At generating operation 508, presentation rules are generated according to the interface information. The presentation rules are used to conform the look and feel of the content delivered to the interface characteristics of the electronic device. It is contemplated that presentation rules may be manually entered by an administrator directly only once for each new device or device type. Furthermore, this operation may include a presentation rule optimizer to convert or optimize old presentation rules stored in the presentation rules pool into new content rules that are optimized for the electronic device. The user may also manually select and assemble a set of presentation rules for the electronic device from the presentation rules pool. After generating operation 508 is completed, control passes to combining operation 510.

At combining operation 510, the content rules and the presentation rules are merged to form translation instructions. In one embodiment of the invention, the translation instructions are formatted as one or more XSLT style sheet. The content selection or tags extraction portion of the XSLT style sheet is constructed from the content rules, while the presentation style portion of the XSLT style sheet is constructed from the presentation rules. Once combining operation 510 is completed, control passes to storing operation 512.

During storing operation 512, the translation instructions are stored in translation instruction pool. This pool helps speed future run-time communications with the electronic device by making the translation instructions available without constructing the content and presentation rules each time the XSLT style sheet is required. The translation instruction pool may be stored locally or remotely from the application server. Furthermore, storing operation 512 may include saving the content and presentation rules created during generating operations 506 and 508 in content and presentation rule pools respectively. Once storing operation 512 is completed, control passes to transforming operation 514.

At transforming operation 514, the first markup document is transformed into one or more new documents according to the translation instructions. In a particular embodiment of the invention, an XSLT engine is utilized to translate the first markup document into the new document. An example of such an XSLT engine is the IBM Websphere Transcoding Publisher (WTP). As discussed above, the new documents may be embodied under a different markup language standards, such as HTML, HDML, WML, cHTML, Palm OS HTML, VoiceXML, and other protocols known to those skilled in the art. Upon completion of transforming operation 514, control passes to transmitting operation 516.

At transmitting operation 516, the new document is communicated with the electronic device by the application server. Various protocols known in the art may be used to transmit the new document, such as WAP and TCP-IP. Upon completion of transmitting operation 516, the procedure is ended.

Thus, the present invention can be beneficially used to automatically generate different style sheets for various devices. Such style sheets can be cumbersome, tedious, and time consuming to create manually. Furthermore, the present invention helps reduce developer overhead of learning different data formats. In addition, the present invention can significantly shorten the development cycle of wireless applications and thereby support a wide range of wireless devices.

The foregoing description of the invention has been presented for purposes of illustration and description. It is not intended to be exhaustive or to limit the invention to the precise form disclosed, and other modifications and variations may be possible in light of the above teachings. For example, XSLT style sheets generated according to the present invention can be used to deliver XML documents to devices of different form factors, such as printers and CRT displays, and special form factors for people with physical or sensory disabilities. The embodiments disclosed were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

The invention claimed is:

1. A method for transforming a first document into a second document, the second document configured for use at an electronic device, the method comprising:
   receiving user interface information about the electronic device;
   selecting content rules for modifying content in the first document according to the user interface information;
   selecting presentation rules for presenting the content from the first document according to the user interface information;
   combining the content rules and presentation rules to form transformation instructions for transforming the first document into the second document;
   generating the content rules according to the user interface information; and
   generating the presentation rules according to the user interface information.

2. The method of claim 1, further comprising receiving a document schema from the first markup document and wherein selecting the content rules includes electing content from the first markup document according to the document schema.

3. The method of claim 1, further comprising storing the transformation instructions in a transformation repository for reuse.

4. The method of claim 1, further comprising:
   storing the content rules in a content rules repository for reuse; and
   storing the presentation rules in a presentation rules repository for reuse.

5. The method of claim 1, further comprising transforming the first markup document into the second document using the transformation instructions.

6. The method of claim 1, further comprising transmitting the second document to the electronic device.

7. A method for transforming a first document into a second document, the second document configured for use at an electronic device, the method comprising:
- receiving user interface information about the electronic device;
- selecting content rules for modifying content in the first document according to the user interface information;
- selecting presentation rules for presenting the content from the first document according to the user interface information; and
- combining the content rules and presentation rules to form transformation instructions for transforming the first document into the second document; and
- wherein the user interface information includes at least one of screen size and keypad type.

8. The method of claim 7, further comprising:
- generating the content rules according to the user interface information; and
- generating the presentation rules according to the user interface information.

9. The method of claim 7, further comprising receiving a document schema from the first markup document and wherein selecting the content rules includes electing content from the first markup document according to the document schema.

10. The method of claim 7, further comprising storing the transformation instructions in a transformation repository for reuse.

11. The method of claim 7, further comprising:
- storing the content rules in a content rules repository for reuse; and
- storing the presentation rules in a presentation rules repository for reuse.

12. The method of claim 7, further comprising transforming the first markup document into the second document using the transformation instructions.

13. The method of claim 7, further comprising transmitting the second document to the electronic device.

* * * * *